United States Patent
Yokoyama et al.

(10) Patent No.: US 9,464,702 B2
(45) Date of Patent: Oct. 11, 2016

(54) SLIDER APPARATUS

(71) Applicant: HIRATA CORPORATION, Shinagawa-ku (JP)

(72) Inventors: Shinji Yokoyama, Shinagawa-ku (JP); Shuichiro Araki, Shinagawa-ku (JP)

(73) Assignee: HIRATA CORPORATION, Shinagawa-Ku, Tokyo (JP)

( * ) Notice: Subject to any disclaimer, the term of this patent is extended or adjusted under 35 U.S.C. 154(b) by 768 days.

(21) Appl. No.: 13/858,342

(22) Filed: Apr. 8, 2013

(65) Prior Publication Data

US 2013/0220042 A1    Aug. 29, 2013

Related U.S. Application Data

(63) Continuation of application No. PCT/JP2011/005137, filed on Sep. 13, 2011.

(30) Foreign Application Priority Data

Oct. 8, 2010  (JP) .................................. 2010-229030

(51) Int. Cl.
*F16H 25/22* (2006.01)
*F16H 25/24* (2006.01)

(52) U.S. Cl.
CPC .............. *F16H 25/22* (2013.01); *F16H 25/24* (2013.01); *F16H 25/2204* (2013.01); *F16H 2025/2436* (2013.01); *Y10T 74/18648* (2015.01)

(58) Field of Classification Search
CPC . F16H 25/22; F16H 25/24; F16H 2025/2436
USPC ................... 74/89.32, 89.34, 89.36
See application file for complete search history.

(56) References Cited

U.S. PATENT DOCUMENTS 2,654,165 A * 10/1953 Lichtenberg ..................... 37/429
4,573,566 A * 3/1986 Roman ....................... 198/461.1
(Continued)

FOREIGN PATENT DOCUMENTS

CN    201513537 U    6/2010
CN    201547198 A    8/2010
(Continued)

OTHER PUBLICATIONS

Office Action issued on Feb. 28, 2015, by the Chinese Patent Office in corresponding Chinese Patent Application No. 201180048584.4. (6 pages).

(Continued)

*Primary Examiner* — William C Joyce
(74) *Attorney, Agent, or Firm* — Buchanan Ingersoll & Rooney PC (57) ABSTRACT

A slider apparatus of the invention includes a ball screw, first and second support members which respectively support the two end portions of the ball screw, a slider which includes a driving means for rotating a ball nut threadably engaging with the ball screw while rotatably holding the ball nut, and is disposed to be movable in the axial direction of the ball screw, first and second intermediate support members which are disposed to sandwich the slider, and each of which includes a support hole through which the ball screw passes and is movable in the axial direction of the ball screw, and a connecting member which engages with the first and second intermediate support members, and allows free movement of the first and second intermediate support members within the range of the full length of the connecting member.

5 Claims, 9 Drawing Sheets (56) References Cited

U.S. PATENT DOCUMENTS

| | | | |
|---|---|---|---|
| 5,319,990 A * | 6/1994 | Veale et al. ................. | 74/89.33 |
| 5,370,214 A * | 12/1994 | Katahira ..................... | 198/345.1 |
| 5,531,557 A * | 7/1996 | Springer ...................... | 414/401 |
| 5,720,202 A * | 2/1998 | Senjo et al. ................. | 74/89.36 |
| 5,949,681 A * | 9/1999 | Asai ..................... | H05K 13/021 |
| | | | 29/759 |
| 5,974,904 A * | 11/1999 | Dirschbacher et al. ..... | 74/89.32 |

FOREIGN PATENT DOCUMENTS

| | | |
|---|---|---|
| JP | 2-066359 A | 3/1990 |
| JP | 2000-179638 A | 6/2000 |
| JP | 2007-228688 A | 9/2007 |
| JP | 2007-255438 A | 10/2007 |

OTHER PUBLICATIONS

International Search Report (PCT/ISA/210) issued on Nov. 29, 2011, by the Japanese Patent Office as the International Searching Authority for International Application No. PCT/JP2011/005137.

Written Opinion (PCT/ISA/237) issued on Nov. 29, 2011, by the Japanese Patent Office as the International Searching Authority for International Application No. PCT/JP2011/005137.

* cited by examiner

SLIDER APPARATUS

TECHNICAL FIELD

The present invention relates to an apparatus using a ball screw mechanism.

BACKGROUND ART

In an apparatus with an arrangement in which a ball screw mechanism moves a slider along a ball screw, the moving range of the slider depends on the length of the ball screw. If the length of the ball screw is increased to widen the moving range of the slider, the natural frequency of the ball screw decreases, and the movement of the slider causes vibrations of the ball screw, thereby producing resonance. To solve this problem, it is proposed to support the ball screw at an intermediate portion in addition to the two end portions. For example, PTL1 discloses an apparatus in which intermediate support mechanisms for supporting a ball screw are respectively disposed at the two ends of a slider, and the intermediate mechanisms move with the movement of the slider by a power transmission mechanism including a wire and pulley. Furthermore, PTL2 discloses an apparatus in which support members are respectively arranged on the two sides of a slider (driven member) and two types of thread grooves are formed in a ball screw wherein the slider threadably engages with one type of thread groove and the support member threadably engages with the other type of thread groove.

CITATION LIST

Patent Literature

PTL1: Japanese Patent Laid-Open No. 2007-228688
PTL2: Japanese Patent Laid-Open No. 2000-179638

SUMMARY OF INVENTION

Technical Problem

In the apparatus disclosed in PTL1, however, there is a restriction on the relationship between the moving range of the slider and the distance between the intermediate support mechanisms, and thus it is especially necessary to increase the distance between the intermediate support mechanisms in proportion to the moving range of the slider. Therefore, as the moving range of the slider becomes wider, the supporting effect of the ball screw near the slider may reduce. It is difficult to provide the apparatus described in PTL1 with an arrangement in which a plurality of sliders move by a common ball screw. For the apparatus described in PTL2, it is necessary to form two types of thread grooves in the ball screw.

The present invention has as its object to widen the moving range of a slider while supporting a ball screw near the slider.

Solution to Problem

According to the present invention, there is provided a slider apparatus comprising a ball screw, a first support member and a second support member which respectively support two end portions of the ball screw, a slider which includes driving means for rotating a ball nut threadably engaging with the ball screw while rotatably holding the ball nut, and is disposed to be movable in an axial direction of the ball screw, a first intermediate support member and a second intermediate support member which are disposed to sandwich the slider, and each of which includes a support hole through which the ball screw passes, and is movable in the axial direction of the ball screw, and a connecting member which engages with the first intermediate support member and the second intermediate support member, and allows free movement of the first intermediate support member and the second intermediate support member within a range of a full length of the connection member.

Furthermore, according to the present invention, there is provided a slider apparatus comprising a ball screw, a first support member and a second support member which respectively support two end portions of the ball screw, a first slider and a second slider, each of which includes driving means for rotating a ball nut threadably engaging with the ball screw while rotatably holding the ball nut, and is disposed to be movable in an axial direction of the ball screw, a first intermediate support member, a second intermediate support member, and a third intermediate support member, each of which includes a support hole through which the ball screw passes, and is movable in the axial direction of the ball screw, a first connecting member which engages with the first intermediate support member and the second intermediate support member, and allows free movement of the first intermediate support member and the second intermediate support member within a range of a full length of the first connecting member, and a second connecting member which engages with the second intermediate support member and the third intermediate support member, and allows free movement of the second intermediate support member and the third intermediate support member within a range of a full length of the second connecting member, wherein the first intermediate support member and the second intermediate support member are disposed to sandwich the first slider, and the second intermediate support member and the third intermediate support member are disposed to sandwich the second slider.

Advantageous Effects of Invention

According to the present invention, it is possible to widen the moving range of a slider while supporting a ball screw near the slider.

DESCRIPTION OF EMBODIMENTS

<First Embodiment>
<Arrangement of Slider Apparatus>

Figure 1A:
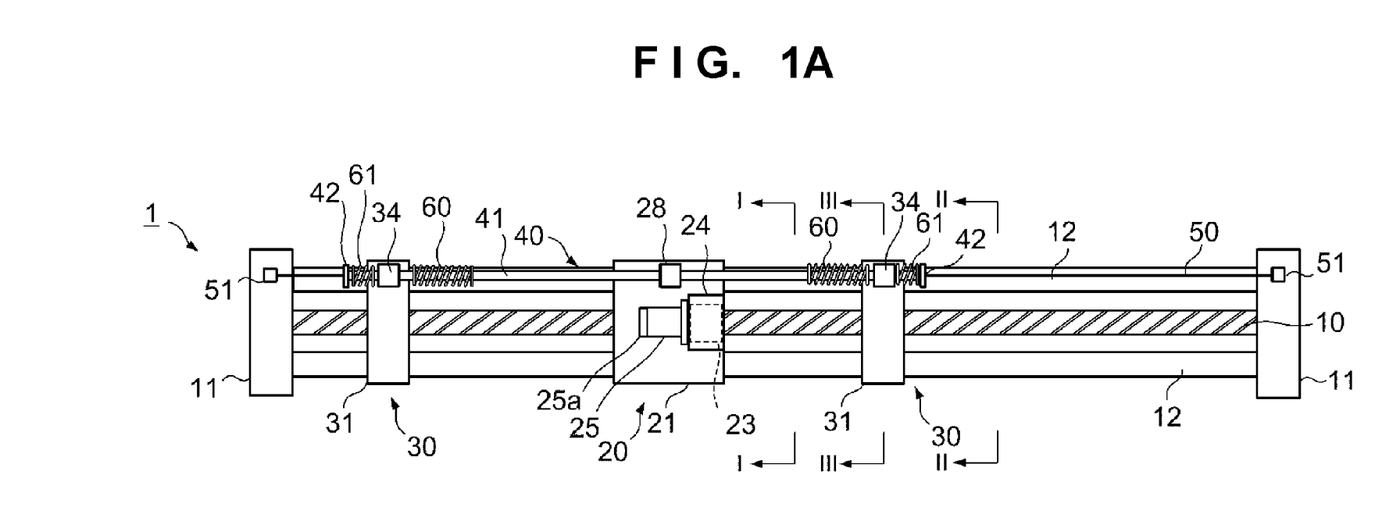
FIG. 1A is a plan view showing a slider apparatus 1 according to an embodiment of the present invention.
Figure 2A:
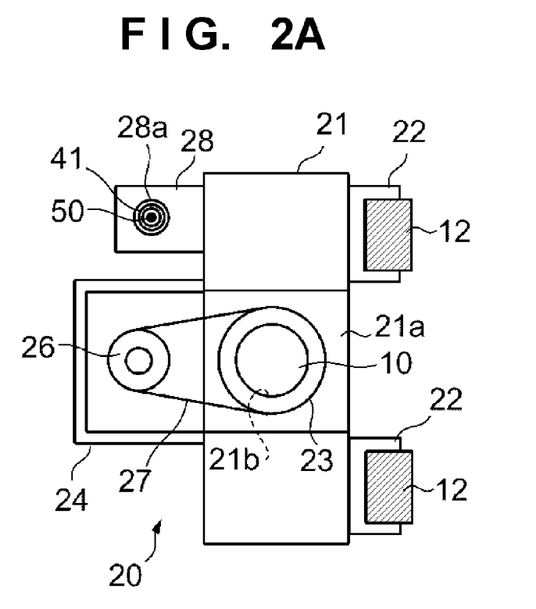
FIG. 2A is a sectional view taken along a line I-I in FIG. 1A.
Figure 2B:
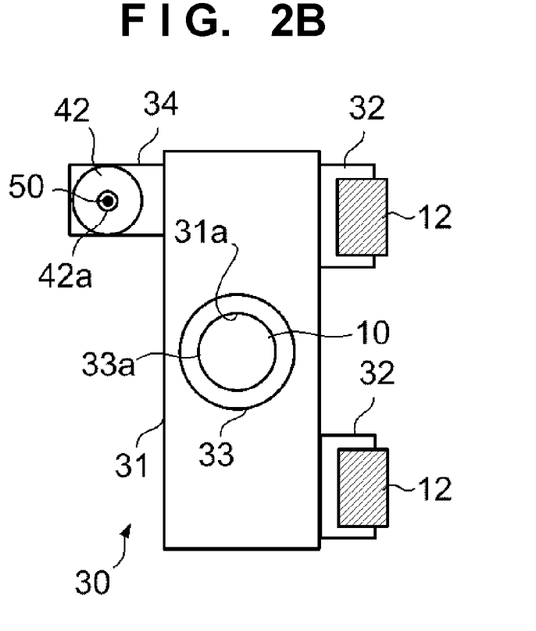
FIG. 2B is a sectional view taken along a line II-II in FIG. 1A.
Figure 2C:
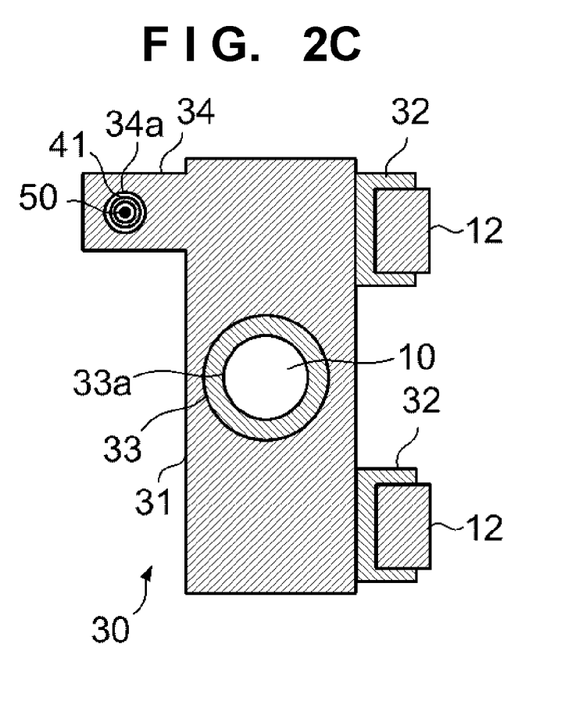
FIG. 2C is a sectional view taken along a line III-III in FIG. 1A.

FIG. 1A is a plan view showing a slider apparatus 1 according to an embodiment of the present invention. FIG. 2A is a sectional view taken along a line I-I in FIG. 1A. FIG. 2B is a sectional view taken along a line II-II in FIG. 1A. FIG. 2C is a sectional view taken along a line III-III in FIG. 1A. The arrangement of the slider apparatus 1 will be described with reference to FIGS. 1A and 2A to 2C.

The slider apparatus 1 includes a ball screw 10 and a pair of support members 11 for supporting the two end portions of the ball screw 10. Each end portion of the ball screw 10 is fixed to one support member 11. The pair of support members 11 includes a pair of sliding guides 12 like rails, which are arranged in a direction parallel to the axial direction of the ball screw 10. Each support member 11 includes a stretching portion 51. A wire 50 is stretched between the stretching portions 51 in a direction parallel to the axial direction of the ball screw 10. The wire 50 is, for example, a metal wire.

In various kinds of apparatuses to which the slider apparatus 1 is applied, a slider 20 is used to move a moving target member attached to itself. As shown in FIG. 2A, the slider 20 includes a main body portion 21 having an opening portion 21b through which the ball screw 10 is passes (in FIG. 2A, the opening portion 21b is hidden behind a ball nut 23). Sliding members 22 which engage with the sliding guides 12 and slide along the sliding guides 12 are disposed on the bottom portion of the main body portion 21. The sliding members 22 disable rotation of the main body portion 21 around the axis of the ball screw 10, and the overall slider 20 is guided by the sliding guides 12 to be movable in the axial direction of the ball screw 10.

A concave portion (notched portion) 21a is formed at one end portion (a right end portion in FIG. 1A) of the main body portion 21, and the main body portion 21 has a U shape in a planar view. The ball nut 23 threadably engaging with the ball screw 10 is rotatably arranged within the concave portion 21a. A motor support member 24 is arranged to cover the upper portion of the concave portion 21a while supporting a motor 25.

The output shaft of the motor 25 extends to a space surrounded by the motor support member 24, and is provided with a pulley 26. A timing belt 27 is looped around the pulley 26 and ball nut 23. As the motor 25 rotates, the ball nut 23 also rotates. Rotation of the ball nut 23 moves the slider 20 in the axial direction of the ball screw 10. The slider 20 is moved forward or backward in the axial direction according to rotation or reverse rotation of the motor 25. A sensor 25a serves as an encoder for detecting the rotation angle of the output shaft of the motor 25, and can detect the position and speed of the slider 20 based on the detection result. Note that in this embodiment, the rotation angle of the output shaft of the motor 25 is detected. It is, however, possible to adopt various kinds of sensors which can detect the position and speed of the slider 20.

The timing belt 27 is, for example, a toothed belt. Teeth (grooves) which mesh with the teeth of the toothed belt are formed on the outer peripheral surfaces of the pulley 26 and ball nut 23. In this embodiment, a driving mechanism of causing a belt transmission mechanism to transmit rotation of the motor 25 to the ball nut 23 and rotating it has been exemplified. However, it is also possible to adopt, for example, another type of driving mechanism of directly transmitting rotation of a hollow motor to the ball nut 23 and rotating it.

Two intermediate support member 30 are members for supporting the ball screw 10 at intermediate portions and are disposed to sandwich the slider 20. As shown in FIG. 2B, the intermediate support member 30 includes a main body portion 31 and a support portion 33 which is attached to an opening portion 31a of the main body portion 31 and supports the ball screw 10. The support portion 33 is, for example, a rubber or resin bushing, and includes a support hole 33a through which the ball screw 10 is inserted. The diameter of the support hole 33a is preferably slightly larger than the external diameter of the ball screw 10 so as to support the ball screw 10 within the range in which smooth movement of the intermediate support member 30 with respect to the ball screw 10 is not hindered.

Sliding members 32 which engage with the sliding guides 12 and slide along the sliding guides 12 are disposed on the bottom portion of the main body portion 31. With this arrangement, the overall intermediate support member 30 is guided by the sliding guides 12 to be movable in the axial direction of the ball screw 10.

Although the slider 20 and the intermediate support members 30 are guided by the common sliding guides 12 in this embodiment, sliding guides for the slider 20 and those for the intermediate support members 30 may be individually disposed. Sharing sliding guides as in the embodiment is advantageous for decreasing the number of parts. If there are a plurality of sliding guides as in the embodiment, it is preferable to share at least one sliding guide.

The slider apparatus 1 also includes a connecting member 40 which engages with each intermediate support member 30, and allows free movement of each intermediate support member 30 within the range of its full length. In this embodiment, the connecting member 40 serves as a rod member including a rod portion 41 which extends parallel to the axial direction of the ball screw 10, and stopper portions 42 disposed at the two end portions of the rod portion 41.

The intermediate support member 30 includes a guide portion 34 which guides movement of the rod portion 41 of the connecting member 40 in the axial direction. In this embodiment, the guide portion 34 includes a guide hole 34a formed in a direction parallel to the axial direction of the ball screw 10. By inserting the rod portion 41 through the guide hole 34a, movement of the rod portion 41 in the axial direction is guided. Note that the rod portion 41 is inserted through the guide hole 34a of circular cross section in this embodiment. Instead of the guide hole 34a, for example, a guide groove of C-shaped cross section may be formed in the guide portion 34, thereby guiding the rod portion 41. Each stopper portion 42 is larger than the guide hole 34a, and is positioned outside the corresponding guide portion 34.

As will be described later, therefore, if the rod portion 41 is moved in the axial direction, and the stopper portion 42 reaches the guide portion 34, the stopper portion 42 engages with (is caught by) the guide portion 34, thereby stopping movement of the rod portion 41 in the axial direction. More specifically, the slider 20 is moved toward one intermediate support member 30 to abut against it. After that, the intermediate support member 30 is moved together with the slider 20 in the axial direction away from the other intermediate support member 30. If the guide portion 34 of the intermediate support member 30 reaches one stopper portion 42, it engages with (is caught by) the stopper portion 42. After that, the intermediate support member 30 starts to move in the axial direction together with the stopper portion 42 (that is, the connecting member 40). If the distance between the intermediate support members 30 is equal (or almost equal) to the full length of the connecting member 40, the stopper portions 42 respectively engage with the guide portions 34, thereby preventing the intermediate support members 30 from moving away from each other. After that, the connecting member 40 following movement of the slider 20 and one intermediate support member 30 pulls (pushes) the other intermediate support member 30, which then moves.

On the other hand, if the distance between the intermediate support members 30 is shorter than the full length of the connecting member 40, each stopper portion 42 does not engage with the corresponding guide portion 34, and thus the intermediate support members 30 can freely move. In this embodiment, the connecting member 40 with such simple arrangement can allow free movement of the intermediate support members 30 within the range of the full length of the connecting member 40.

Note that in this embodiment, the slider 20 also includes a guide portion 28 which guides movement in the axial direction of the rod portion 41 of the connecting member 40. Disposing the guide portion 28 in the slider 20 enables to support an intermediate portion of the connecting member 40, thereby preventing its bending. In this embodiment, the guide portion 28 has the same arrangement as that of the guide portion 34, and includes a guide hole 28a formed in a direction parallel to the axial direction of the ball screw 10. By inserting the rod portion 41 through the guide hole 28a, movement in the axial direction of the rod portion 41 is guided. The guide holes 28a and 34a are positioned in line in a direction parallel to the axial direction of the ball screw 10, as a matter of course.

Figure 2D:
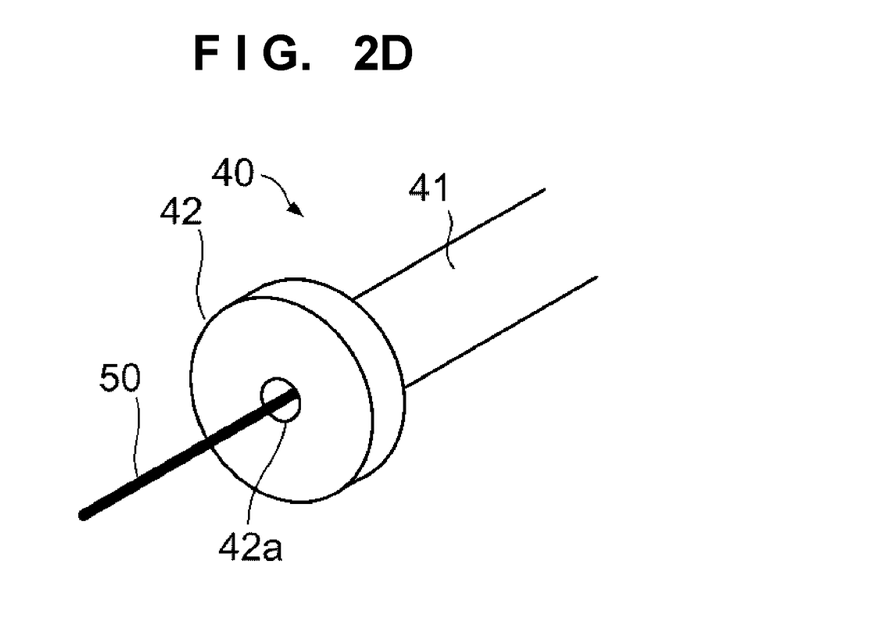
FIG. 2D is a perspective view showing an end portion of a connecting member 40.

Furthermore, in the embodiment, the connecting member 40 has a cylindrical shape, and the wire 50 is inserted through the connecting member 40. FIG. 2D is a perspective view showing one end portion of the connecting member 40. FIG. 2D shows the wire 50 inserted through the connecting member 40. The rod portion 41 of the connecting member 40 has a circular cylindrical shape, and the stopper portion 42 includes a hole 42a and includes a flange shape with a diameter larger than that of the rod portion 41. The wire 50 is inserted from the hole 42a of the stopper portion 42 at one end portion into the connecting member 40, and comes out from the hole 42a of the stopper portion 42 at the other end portion. In this embodiment, the connecting member 40 has a cylindrical shape to reduce its weight while preventing bending of the connecting member 40 by the wire 50.

In this embodiment, the connecting member 40 is a rod member. The arrangement of the connecting member 40, however, is not limited to this. For example, a cord having stopper portions corresponding to the stopper portions 42 at the two end portions can be adopted as a connecting member.

Referring back to FIG. 1A, in this embodiment, spring members 60 and 61 into which the rod portion 41 of the connecting member 40 is loosely inserted are included. Both the spring members 60 and 61 are coil springs. The spring member 60 is arranged between the slider 20 and each intermediate support member 30. The spring member 61 is arranged between each intermediate support member 30 and the corresponding stopper portion 42. In this embodiment, since the spring member 61 exists, the stopper portion 42 engages with the guide portion 34 through the spring member 61.

When the slider 20 moves as will be described later, the spring members 60 and 61 exhibit a shock absorbing effect between the slider 20 and the intermediate support member 30 and between the intermediate support member 30 and the stopper portion 42. In this embodiment, the rod portion 41 is loosely inserted into the spring member 60. However, the spring member 60 need only be disposed between the slider 20 and the intermediate support member 30. For example, the spring member 60 may be attached to the main body portion 21 or 31. Note that in the arrangement of this embodiment, the rod portion 41 can be used as a support member for the spring member 61. Furthermore, although the spring member 60 has been exemplified in this embodiment, the present invention is not limited to this and any stretchable elastic member may be used.

Figure 1B:
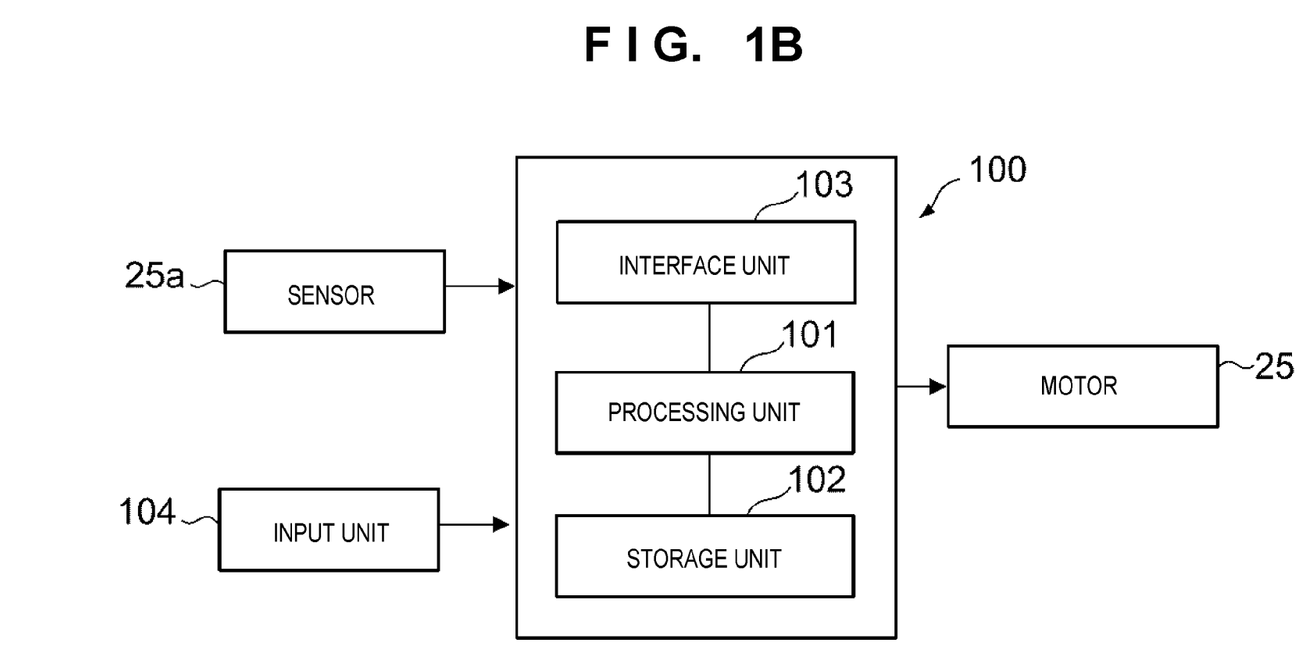
FIG. 1B is a block diagram showing a control unit 100 of the slider apparatus 1.

The control unit of the slider apparatus 1 will be described. FIG. 1B is a block diagram showing a control unit 100 of the slider apparatus 1. The control unit 100 includes a processing unit 101 such as a CPU, a storage unit 102 such as a RAM, ROM, or hard disk, and an interface unit 103 for interfacing between an external device and the processing unit 101.

An input unit 104 serves as an input device such as a keyboard or mouse for accepting an instruction from an operator, or a communication interface for receiving an instruction from a host computer.

In response to an instruction input through the input unit 104, for example, the processing unit 101 executes a program stored in the storage unit 102, and controls drive of the motor 25 based on the detection result of the sensor 25a.

<Example of Operation>

An example of the operation of the slider apparatus 1 will be described. In the slider apparatus 1, the intermediate support members 30 are arranged to sandwich the slider 20. If the slider 20 moves in one direction, it interferes with one of the intermediate support members 30. Since, however, the intermediate support members 30 can basically, freely move, the slider 20 moves while pushing the intermediate support member 30 which is in its way.

On the other hand, the distance between the intermediate support members 30 is regulated by the connecting member 40 within the range of the full length of the connecting member 40. The slider 20, therefore, moves while pushing the intermediate support member 30 which is interfered with and pulling (pushing), via the intermediate support member 30 and connecting member 40, the other intermediate support member 30. The intermediate support members 30 on the two sides of the slider 20 are always spaced apart from each other within the range of the full length of the connecting member 40, and support the ball screw 10 near the slider 20. Since the intermediate support members 30 are movable, the moving range of the slider 20 can be longer without being restricted by the initial distance between the intermediate support members 30.

Figure 3:
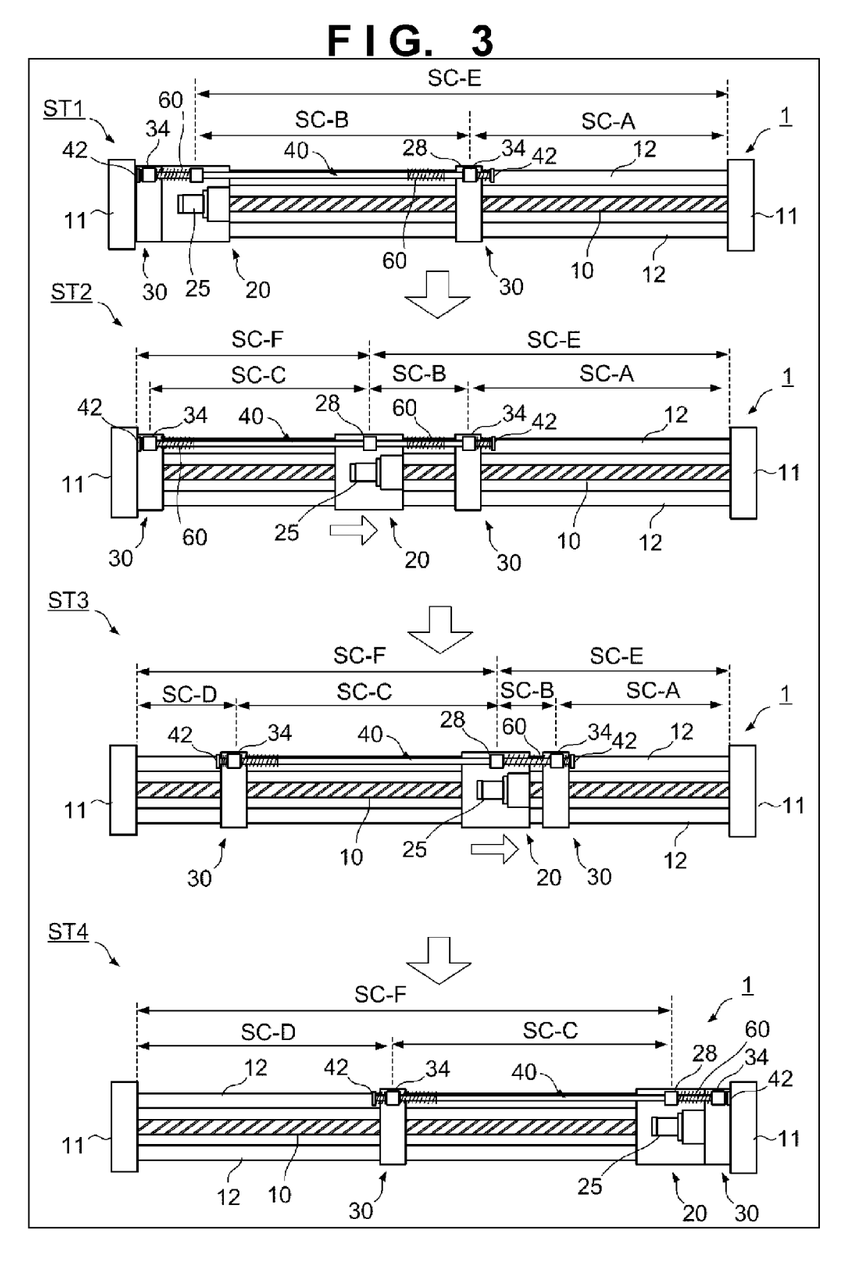
FIG. 3 is a view for explaining an example of the operation of the slider apparatus 1.

FIG. 3 is a view for explaining an example of the operation of the slider apparatus 1. FIG. 3 shows a case in which the slider 20 moves from one end portion of the ball screw 10 to the other end portion of the ball screw 10. In a state ST1, one (left in FIG. 3) intermediate support member 30 is positioned at the leftmost end, and the slider 20 abuts against the left intermediate support member 30 and is positioned at the left end of the moving range. In this example, the other intermediate support member 30 is positioned a distance slightly shorter than the full length of the connecting member 40 away from the left intermediate support member 30.

In a state ST2, the slider 20 has started to move in the right direction but does not interfere with the right support member 11, and thus both the intermediate support members 30 stay still. In a state ST3, the slider 20 has further moved, and interferes with the right intermediate support member 30 via the spring member 60. In this state, the slider 20 moves while pushing the intermediate support member 30. Furthermore, as the right intermediate support member 30 moves, the left intermediate support member 30 is pushed to move via the connecting member 40.

In a state ST4, movement of the slider 20 is complete and the other intermediate support member 30 is positioned at the rightmost end. The slider 20 abuts against the other intermediate support member 30 and is positioned at the right end of the moving range. The other intermediate support member 30 is positioned away from the left intermediate support member 30 within the range of the full length of the connecting member 40.

<Suppression of Resonance>

Figure 4:
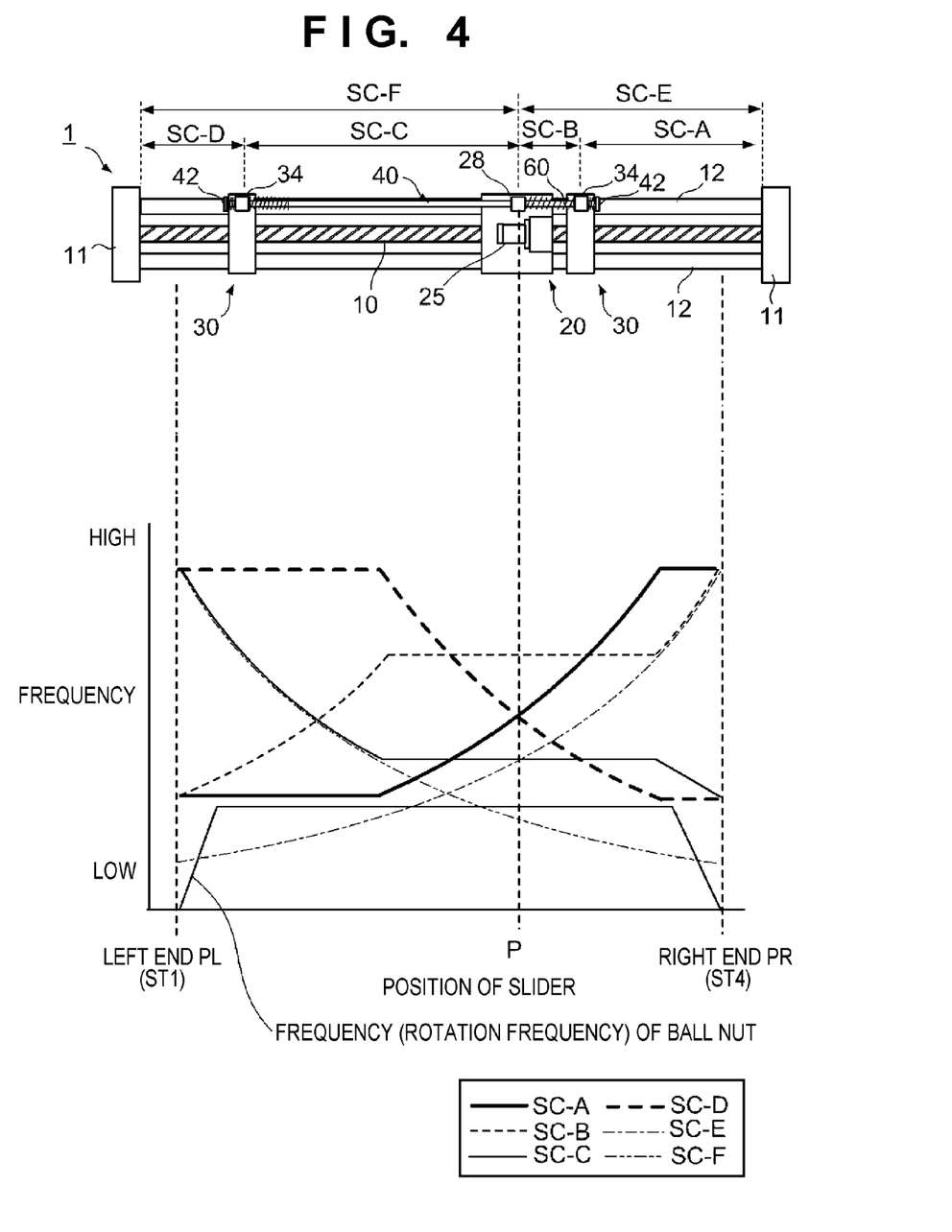
FIG. 4 is a view for explaining a change in primary natural frequency of a ball screw 10 according to the position of a slider 20.

It is known in a ball screw mechanism that when the natural frequency of a ball screw coincides with the frequency (rotation frequency) of a ball nut, resonance occurs, thereby causing strong vibrations of the slider apparatus 1. In this embodiment, by disposing the intermediate support members 30 to support the intermediate portions of the ball screw 10, it becomes possible to increase the primary natural frequency of the ball screw 10, thereby preventing resonance of the ball screw 10 and ball nut 23. This point will be described with reference to FIG. 4. FIG. 4 is a view for explaining a change in primary natural frequency of the ball screw 10 according to the position of the slider 20.

The natural frequency of the ball screw 10 depends on the length of its free portion. In this embodiment, the two ends of the ball screw 10 are supported by the support members 11 while the intermediate portions of the ball screw 10 are supported by the slider 20 (ball nut 23) and the intermediate support members 30. As shown in FIG. 4, therefore, the free portion is divided into four sections: sections SC-A and SC-D between the respective support members 11 and the respective intermediate support members 30 and sections SC-B and SC-C between the slider 20 and the respective intermediate support members 30. The length of each section changes according to the positions of the slider 20 and intermediate support members 30. For reference purpose, sections SC-E and SC-F shown in FIG. 4 respectively represent free portions if the intermediate support members 30 are not disposed, and also indicate sections between the respective support members 11 and the slider 20. These sections are also shown in FIG. 3 for reference purpose.

Note that more specifically, the length of the section between the support member 11 and the intermediate support member 30 is the distance between the supported end of the ball screw 10 of the support member 11 and the supported end of the ball screw 10 of the intermediate support member 30 (the end of the support hole 33a on the support member 11 side). The length of the section between the slider 20 and the intermediate support member 30 is the distance between the end of the ball nut 23 on the intermediate support member 30 side and the supported end of the ball screw 10 of the intermediate support member 30 (the end of the support hole 33a on the slider 20 side). For descriptive convenience, however, each section is represented with reference to the central portion of each of the slider 20 and intermediate support members 30 in FIGS. 3 and 4.

FIG. 4 shows a change in primary natural frequency of each section of the ball screw 10 according to the position of the slider 20 within the section when the slider 20 moves between the left end (a position PL: the state ST1 in FIG. 3) and right end (a position PR: the state ST4 in FIG. 3) of the moving range. For example, the section SC-A has a longest length and a lowest primary natural frequency from when the slider 20 is positioned at the left end (position PL) until the slider 20 reaches a position where it interferes with the right intermediate support member 30. As the slider 20 further moves in the right direction, the length of the section SC-A gradually shortens while the primary natural frequency gradually increases. If the right intermediate support member 30 reaches the right support member 11, the primary natural frequency becomes highest (after that, the primary natural frequency is constant).

The section SC-D has a relationship opposite to that of the section SC-A. That is, the SC-D has a shortest length and a highest primary natural frequency from when the slider 20 is positioned at the left end (position PL) until the slider 20 reaches a position where it interferes with the right intermediate support member 30. As the slider 20 further moves in the right direction and the left intermediate support member 30 starts to move in the right direction, the length of the section SC-D gradually increases while the primary natural frequency gradually decreases. If the right intermediate support member 30 reaches the right support member 11, the primary natural frequency becomes lowest (after that, the primary natural frequency is constant). The same applies to the sections SC-B and SC-C.

As shown in FIG. 4, it is possible to prevent resonance by controlling drive of the motor 25 so that the highest frequency (highest rotation frequency) of the ball nut 23 is lower than the primary natural frequency of each of the sections SC-A, SC-B, SC-C, and SC-D. In other words, it is possible to prevent resonance by designing the length of each of the sections SC-A, SC-B, SC-C, and SC-D so that each primary natural frequency is higher than the highest frequency (highest rotation frequency) of the ball nut 23.

If the intermediate support members 30 are not disposed, the lowest primary natural frequency decreases, as indicated by the primary natural frequencies of the sections SC-E and SC-F in FIG. 4. If transition of the frequency of the ball nut 23 shown in FIG. 4 is adopted, resonance occurs at the intersection of the frequency and each primary natural frequency. It is, therefore, found that the intermediate support members 30 have the effect of avoiding resonance.

Note that in addition to vibrations caused by rotation of the ball nut 23, vibrations generated when the intermediate support member 30 moves and the support portion 33 rides over the screw groove of the ball screw 10 may cause resonance of the slider apparatus 1. If the slider 20 and the intermediate support members 30 move at an equal velocity, vibrations of the same frequency band may be generated, thereby causing resonance. If the slider 20 and the intermediate support member 30 move in contact with each other, the above-described resonance may increase the amplitude. In this embodiment, however, since the spring member 60 is disposed between the slider 20 and the intermediate support member 30, it absorbs transmission of vibrations between the slider 20 and the intermediate support member 30. The amplitude of vibrations can be expected to decay by setting the length or spring constant of the spring member 60 so that the slider 20 and intermediate support member 30 do not contact each other when the slider 20 moves while pushing the intermediate support member 30. The spring member 60 thus has the effect of suppressing the amplitude of vibrations.

There is also the following method of avoiding the occurrence of resonance. A three-dimensional structure is formed on one of the inner circumferential wall of the opening portion 21b of the slider 20 and that of the support hole 33a of the intermediate support member 30 in its longitudinal direction, or a three-dimensional structure is differently formed on both the inner circumferential walls. More specifically, for example, grooves are formed on the inner circumferential wall of the support hole 33a while no such grooves are formed on the inner circumferential wall of the opening portion 21b. Grooves may be formed in a spiral in the longitudinal direction of the support hole 33a, or annular grooves with predetermined pitches may be formed in the longitudinal direction of the support hole 33a. With this arrangement, it is possible to prevent resonance even if the slider 20 and the intermediate support member 30 move at an equal speed, because the frequency of vibrations generated when the inner circumferential wall of the opening portion 21b rides over the screw groove of the ball screw 10 is different from that of vibration generated when the inner circumferential wall of the support hole 33a rides over the screw groove of the ball screw 10.

<Second Embodiment>

Figure 5A:
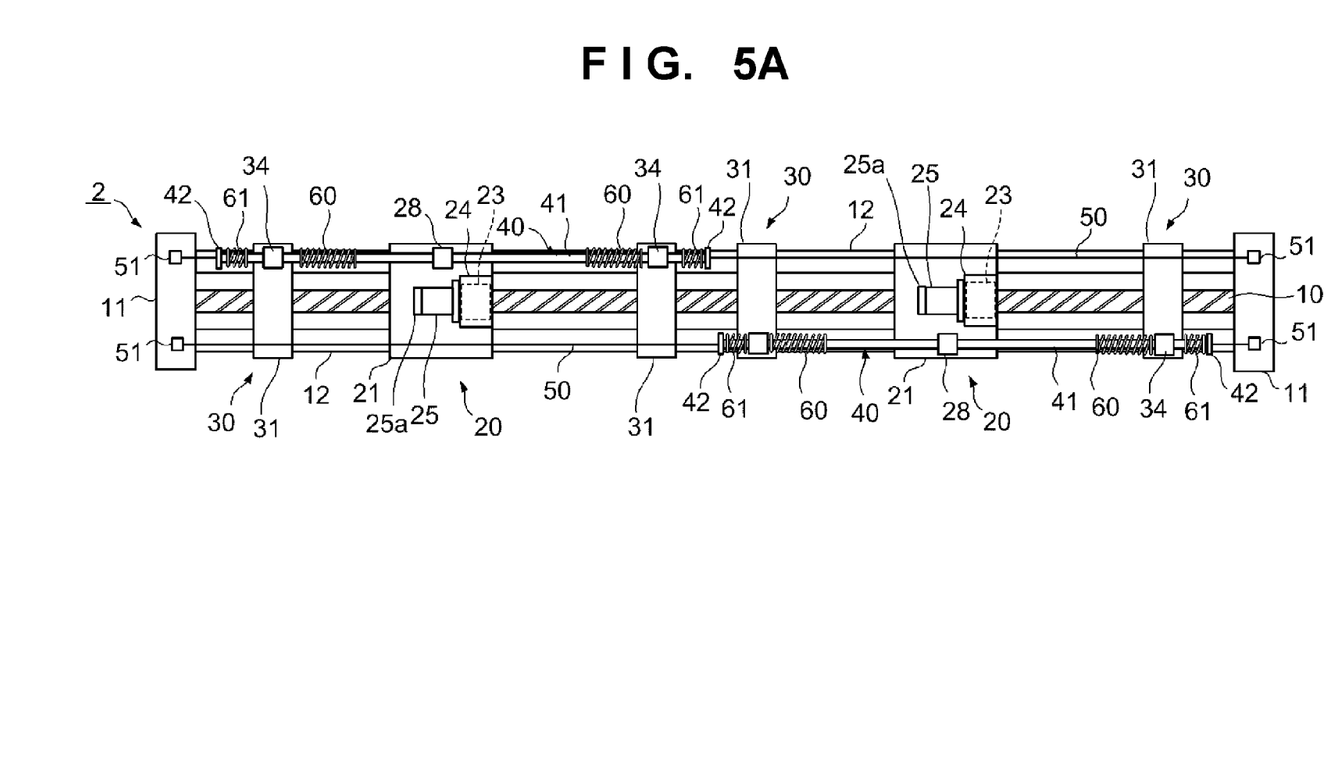
FIG. 5A is a plan view showing a slider apparatus 2 according to another embodiment of the present invention.

In the above-described first embodiment, one slider 20 is provided. However, a plurality of sliders 20 may be disposed for one ball screw 10. A slider apparatus 2 shown in FIG. 5A is provided with two sliders 20. In the example shown in FIG. 5A, the same ball screw 10 and sliding guides 12 as those in the above-described embodiment are provided, and two sets of the same slider 20 and intermediate support members 30 as those in the above-described embodiment are disposed.

Note that to prevent interference, connecting members 40 for the respective sets are arranged on different lines parallel to the ball screw 10. In this embodiment, the connecting members 40 for the respective sets are arranged on the opposite sides with respect to the axis line of the ball screw 10. A stretching portion 51 and wire 50 are arranged according to a corresponding connecting member 40.

In this example, since it is possible to individually control movement of the respective sliders 20, various apparatuses to which the slider apparatus 1 is applied can move a plurality of moving target members independently of each other by sharing the ball screw 10 and the like. Note that although two sets of slider 20 and intermediate support members 30 are disposed in the example shown in FIG. 5A, three or more sets may be provided.

<Third Embodiment>

As in the example shown in FIG. 5A, if a plurality of sliders 20 are disposed for one ball screw 10, the plurality of sliders 20 can share an adjacent intermediate support member 30.

Figure 5B:
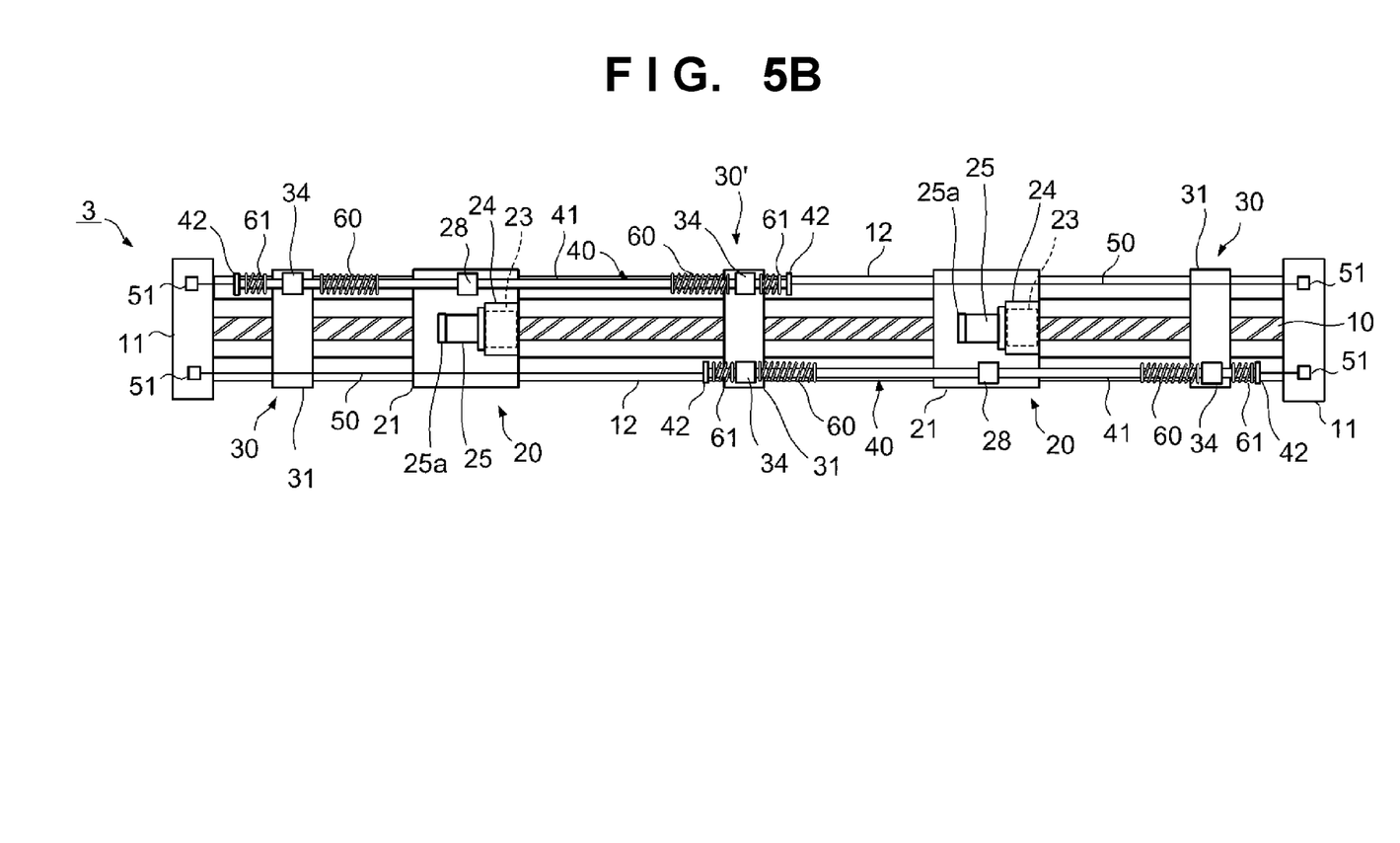
FIG. 5B is a plan view showing a slider apparatus 3 according to still another embodiment of the present invention.

A slider apparatus 3 shown in FIG. 5B is obtained by replacing, with one intermediate support member 30', the intermediate support members 40 adjacent to each other in the slider apparatus 2 shown in FIG. 5A. FIG. 5B shows a case in which two sliders 20 share the intermediate support member 30'. The intermediate support member 30' has an arrangement in which two guide portions 34 are provided. Each guide portion corresponds to a connecting member 30 for one slider 20.

In this example, the number of intermediate support members 30 is one smaller than that in the example shown in FIG. 5A. It is, therefore, possible to decrease the number of parts while widening the moving range of the slider 20 by eliminating one intermediate support member 30. Note that sharing the intermediate support member 30' restricts the distance between the two sliders 20.

<Fourth Embodiment>

In the above-described first to third embodiments, if the slider 20 is positioned away from each intermediate support member 30 (for example, in the state ST2 shown in FIG. 3), the spring member 60 is in the state of a free length. On the other hand, if the slider 20 is positioned near one of the intermediate support members 30 (for example, in the state ST1 or ST4 shown in FIG. 3), the spring member 60 is compressed to a maximum and its full length may become shortest. In this way, the spring member 60 repeatedly expands and contracts between the state of a natural length (free length) and the state of the shortest length.

Figure 6:
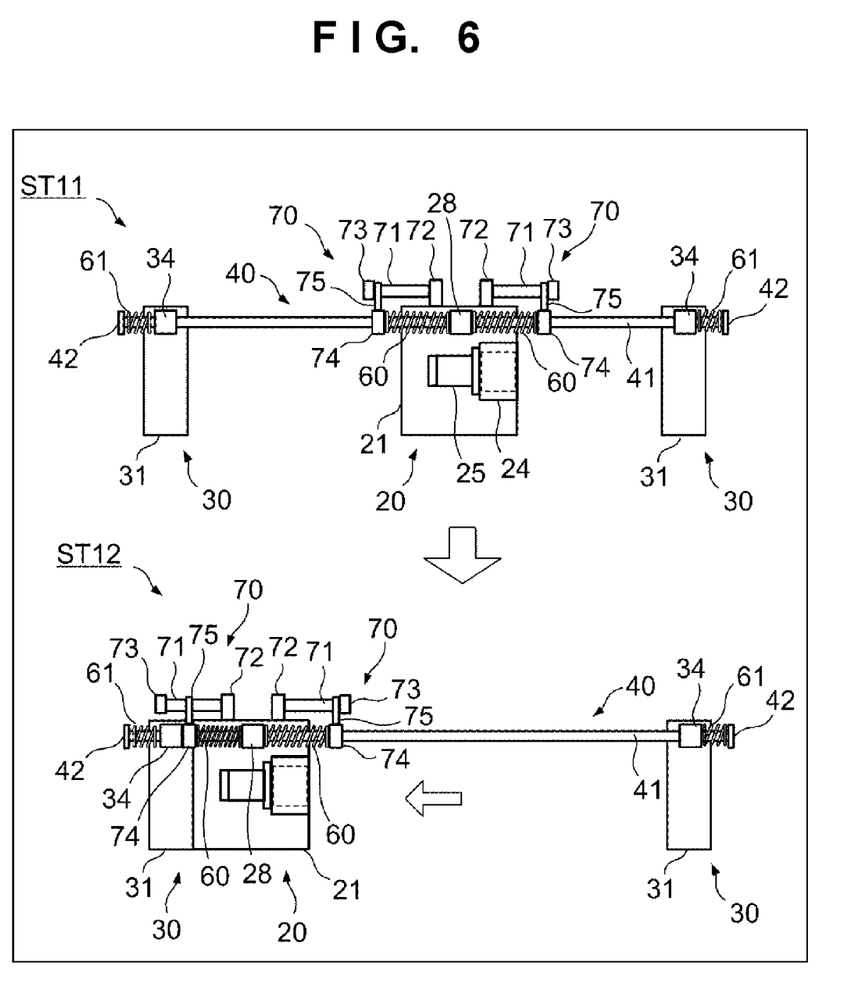
FIG. 6 is a view for explaining a regulation mechanism 70.

In consideration of the life of the spring member 60, the expansion range of the spring member 60 is preferably narrow. To meet this requirement, it is desirable to provide a regulation mechanism of regulating the spring member 60 to return to the state of the natural length, and always maintaining a given compression state (that is, always applying a predetermined compressive stress). FIG. 6 is a view for explaining a regulation mechanism 70.

The regulation mechanism 70 is provided for each spring member 60, and includes a rod portion 71 having a rod shape and fixed to a main body portion 21 of a slider 20 via a support portion 72. The rod portion 71 is supported to be parallel to a rod portion 41 of a connecting member 40. A stopper portion 73 is provided at one end portion of the rod portion 71.

The regulation mechanism 70 includes a stopper portion 74 which slides on the outer peripheral surface of the rod portion 41 of the connecting member 40 along the longitudinal direction. The stopper portion 74 includes a through hole (not shown) through which the rod portion 41 passes. The stopper portion 74 is connected with a locking portion 75. The locking portion 75 includes a through hole (not shown) through which the rod portion 71 passes. The locking portion 75 is slidable on the outer peripheral surface of the rod portion 71 between the support portion 72 and the stopper portion 73 along the longitudinal direction. The regulation mechanism 70 allows the stopper portion 74 to be displaced from a position in a state ST11 toward a guide portion 28.

In the state ST11, the slider 20 is positioned away from both intermediate support members 30. In this case, the spring member 60 is in the state of a natural length in the above-described first to third embodiments. In this embodiment, the spring member 60 has been compressed. That is, the spring members 60 have been respectively compressed between the guide portion 28 and the stopper portions 74, and have a full length shorter than the natural length. The spring members 60 respectively press the corresponding stopper portions 74 by elastic return forces but the movement of each stopper portion 74 is regulated by the stopper portion 73 via the locking portion 75. In this way, the spring members 60 are respectively kept compressed between the guide portion 28 and the stopper portions 74.

In a state ST12, the slider 20 is positioned near one intermediate support member 30. When the slider 20 moves close to one intermediate support member 30, the stopper portion 74 abuts against the guide portion 34 first. When the stopper portion 74 abuts against the guide portion 34, the movement of the stopper portion 74 stops and its position is fixed.

After that, if the slider 20 further moves close to the intermediate support member 30, the spring member 60 (on the left side in FIG. 6) starts to be compressed between the stopper portion 74 and the guide portion 28. The position of the stopper portion 74 is fixed but the rod portion 71 fixed to the slider 20 slides with respect to the locking portion 75 as the slider 20 moves. With this movement, the guide portion 28 moves close to the stopper portion 74, and the spring member 60 is further compressed, resulting in the shortest length of the spring member 60.

As described above, in this embodiment, it is possible to narrow the expansion range by regulating the spring member 60 to return to the natural length, thereby prolonging the life of the spring member 60.

In this embodiment, a case in which the support portions 72 of the regulation mechanism 70 are fixed to the main body portion 21 of the slider 20 has been exemplified. The present invention, however, is not limited to this. For example, the support portions 72 may be respectively fixed to the intermediate support members 30. In this case, it is preferable to wind a compression spring member around the rod portion 71 between the locking portion 75 and the support portion 72.

The invention claimed is:

1. A slider apparatus comprising:
    a ball screw;
    a first support member and a second support member which respectively support two end portions of said ball screw;
    a first slider and a second slider, each of which includes driving means for rotating a ball nut threadably engaging with said ball screw while rotatably holding the ball nut, and is disposed to be movable in an axial direction of said ball screw;
    a first intermediate support member, a second intermediate support member, and a third intermediate support member, each of which includes a support hole through which said ball screw passes, and is movable in the axial direction of said ball screw;
    a first connecting member which engages with said first intermediate support member and said second intermediate support member, and allows free movement of said first intermediate support member and said second intermediate support member within a range of a full length of said first connecting member; and
    a second connecting member which engages with said second intermediate support member and said third intermediate support member, and allows free movement of said second intermediate support member and said third intermediate support member within a range of a full length of said second connecting member,
    wherein said first intermediate support member and said second intermediate support member are disposed to sandwich said first slider, and
    said second intermediate support member and said third intermediate support member are disposed to sandwich said second slider.

2. The slider apparatus according to claim 1, wherein
    said first connecting member and said second connecting member are rod members each of which includes stopper portions at two end portions and extends parallel to said ball screw,
    said first connecting member and said second connecting member are arranged on different lines parallel to said ball screw,
    said first intermediate support member includes a first guide portion which guides movement in an axial direction of the rod member of said first connecting member and engages with the stopper portion,
    said third intermediate support member includes a second guide portion which guides movement in an axial direction of the rod member of said second connecting member and engages with the stopper portion, and
    said second intermediate support member includes
    a third guide portion which guides movement in the axial direction of the rod member of said first connecting member and engages with the stopper portion, and
    a fourth guide portion which guides movement in the axial direction of the rod member of said second connecting member and engages with the stopper portion.

3. The slider apparatus according to claim 2, wherein
    each of the rod members is a cylinder, and
    said slider apparatus comprises
    a wire inserted through the cylinder, and
    stretching means for stretching said wire to be parallel to said ball screw.

4. The slider apparatus according to claim 2, wherein
    said first slider includes a slider side guide portion which guides movement in the axial direction of the rod member of said first connecting member,
    said second slider includes a slider side guide portion which guides movement in the axial direction of the rod member of said second connecting member,
    a first spring member into which the rod member of said first connecting member is loosely inserted is disposed between said first slider and each of said first intermediate support member and second intermediate support member, and
    a second spring member into which the rod member of said second connecting member is loosely inserted is disposed between said second slider and each of said second intermediate support member and third intermediate support member.

5. The slider apparatus according to claim 1, further comprising
    at least one sliding guide which extends parallel to said ball screw and guides movement of said first slider, said first intermediate support member, said second intermediate support member and said third intermediate support member.

\* \* \* \* \*